(12) United States Patent
Lee

(10) Patent No.: US 6,216,008 B1
(45) Date of Patent: Apr. 10, 2001

(54) METHOD AND APPARATUS FOR RETRANSMITTING SHORT MESSAGE UPON TRANSMISSION FAILURE IN MOBILE RADIO TERMINAL

(75) Inventor: Hye-Young Lee, Seoul (KR)

(73) Assignee: Samsung Electronics Co., Inc. (KR)

( * ) Notice: Subject to any disclaimer, the term of this patent is extended or adjusted under 35 U.S.C. 154(b) by 0 days.

(21) Appl. No.: 09/174,762

(22) Filed: Oct. 19, 1998

(30) Foreign Application Priority Data

Oct. 18, 1997 (KR) .................................................. 97-53653

(51) Int. Cl.$^7$ ...................................................... H04R 7/20
(52) U.S. Cl. .................... 455/466; 455/31.3; 340/825.44
(58) Field of Search ..................................... 455/466, 566, 455/31.2, 31.3; 714/748; 340/825.44

(56) References Cited

U.S. PATENT DOCUMENTS

| | | | |
|---|---|---|---|
| 5,577,102 | * 11/1996 | Koivunen | 455/466 |
| 5,628,051 | * 5/1997 | Salin | 455/466 |
| 5,678,179 | * 10/1997 | Turcotte et al. | 455/466 |
| 5,692,032 | * 11/1997 | Seppanen et al. | 455/466 |
| 5,878,351 | * 3/1999 | Alanara et al. | 455/466 |
| 5,878,397 | * 3/1999 | Stille et al. | 455/466 |
| 5,974,300 | * 10/1999 | LaPorta et al. | 455/31.3 |
| 6,014,429 | * 1/2000 | LaPorta et al. | 455/31.3 |

* cited by examiner

Primary Examiner—Dwayne Bost
Assistant Examiner—Quochien B. Vuong
(74) Attorney, Agent, or Firm—Dilworth & Barrese, LLP

(57) ABSTRACT

A method and apparatus are provided for retransmitting a short message in a mobile radio terminal upon a transmission failure of the short message. The method includes the step of transmitting the short message and determining whether the short message is successfully transmitted. It is then determined whether a user selects a retransmission function for the short message, when the short message is not successfully transmitted. The short message is retransmitted, when the user selects the retransmission function.

5 Claims, 2 Drawing Sheets

METHOD AND APPARATUS FOR RETRANSMITTING SHORT MESSAGE UPON TRANSMISSION FAILURE IN MOBILE RADIO TERMINAL

BACKGROUND OF THE INVENTION

1. Field of the Invention

The present invention relates to a short message service for a mobile radio terminal and, in particular, to a method and apparatus for retransmitting a short message in a mobile radio terminal upon a transmission failure of the short message.

2. Description of the Related Art

A short message service (hereinafter referred to as "SMS") enables message communication between mobile radio terminals or between a mobile radio terminal and a wired telephone. In the latter case, the short messages from a fixed communication network (e.g., a Public Switched Telephone Network (PSTN) or an Integrated Services Digital Network (ISDN)) are stored in a processing unit of a motile communication network, converted to digital data, and then transmitted to the mobile radio terminal.

However, when a mobile radio terminal such as, for example, a Global Systems for Mobile (GSM) communication telephone is in a non-service state or cannot access a base station, the mobile radio terminal will not be able to successfully transmit a short message. Conventionally, in the case of a transmission failure as described above, the mobile radio terminal switches to an idle state or some other operating state, irrespective of the user's intent to retransmit the short message. As a result, a user should input the short message he or she previously input in order to retransmit the same. Accordingly, it would be desirable and highly advantageous to provide a method for retransmitting a short message that has not been transmitted due to a transmission failure.

SUMMARY OF THE INVENTION

It is an object of the present invention to provide a method and apparatus for querying a user to determine whether or not the user desires to retransmit a short message which has not been successfully transmitted due to a transmission failure, and retransmitting the short message when the user so desires.

In accordance with one aspect of the present invention, a method for retransmitting a short message in a mobile radio terminal upon a transmission failure of the short message, comprises the steps of: transmitting the short message and determining whether the short message is successfully transmitted; determining whether a user selects a retransmission function for the short message, when the short message is not successfully transmitted; and retransmitting the short message, when the user selects the retransmission function.

DETAILED DESCRIPTION OF PREFERRED EMBODIMENTS

Figure 1:
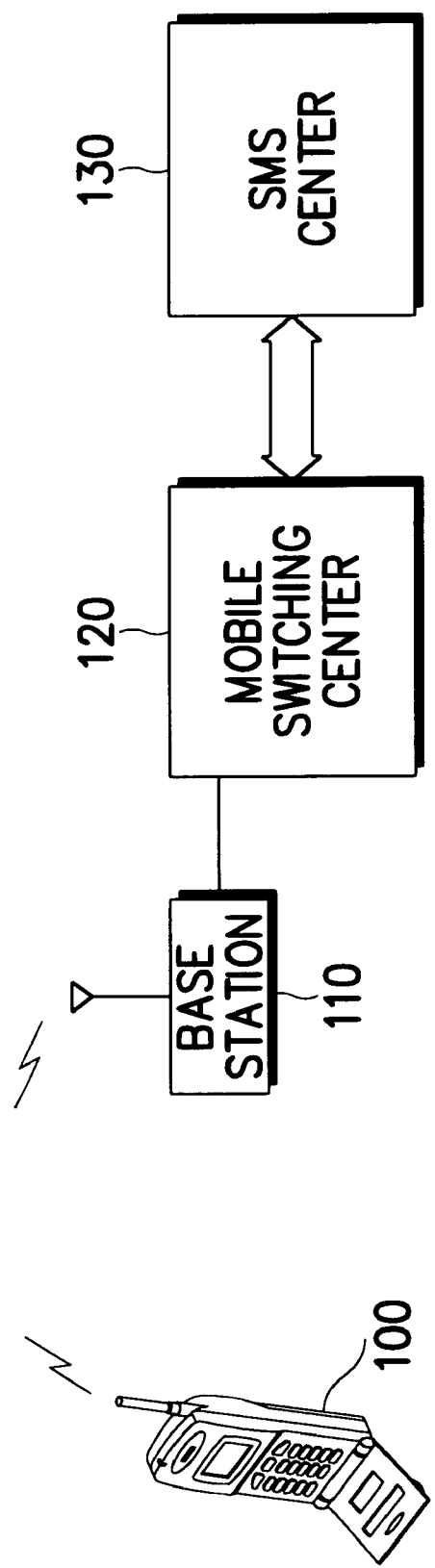
FIG. 1 is a block diagram of a short message service (SMS) system for a mobile radio terminal to which the present invention is applied.

A preferred embodiment of the present invention will be described in detail hereinbelow with reference to the accompanying drawings in which like reference numerals denote the same or similar elements. In the following description, numerous specific details are set forth to provide a more thorough understanding of the present invention. However, it will be apparent to one skilled in the art that the present invention may be practiced without these specific details. In other instances, well known functions or constructions have not been described so as to not obscure the present invention.

FIG. 1 is a block diagram of a short message service (SMS) system for a mobile radio terminal to which the present invention is applied. Referring to FIG. 1, it is assumed that a mobile radio terminal 100 transmits a short message to a base station 110. A mobile switching center 120 acknowledges receipt of the short message to mobile radio terminal 100, and transfers the received short message to another mobile radio terminal called by mobile radio terminal 100. An SMS center 130 which is connected to other mobile switching centers (or to Public Switched Telephone Networks (PSTNs) and Integrated Services Digital Networks (ISDNs)), stores the short message received from mobile switching center 120 and transfers the short message to another mobile switching center.

Figure 2:
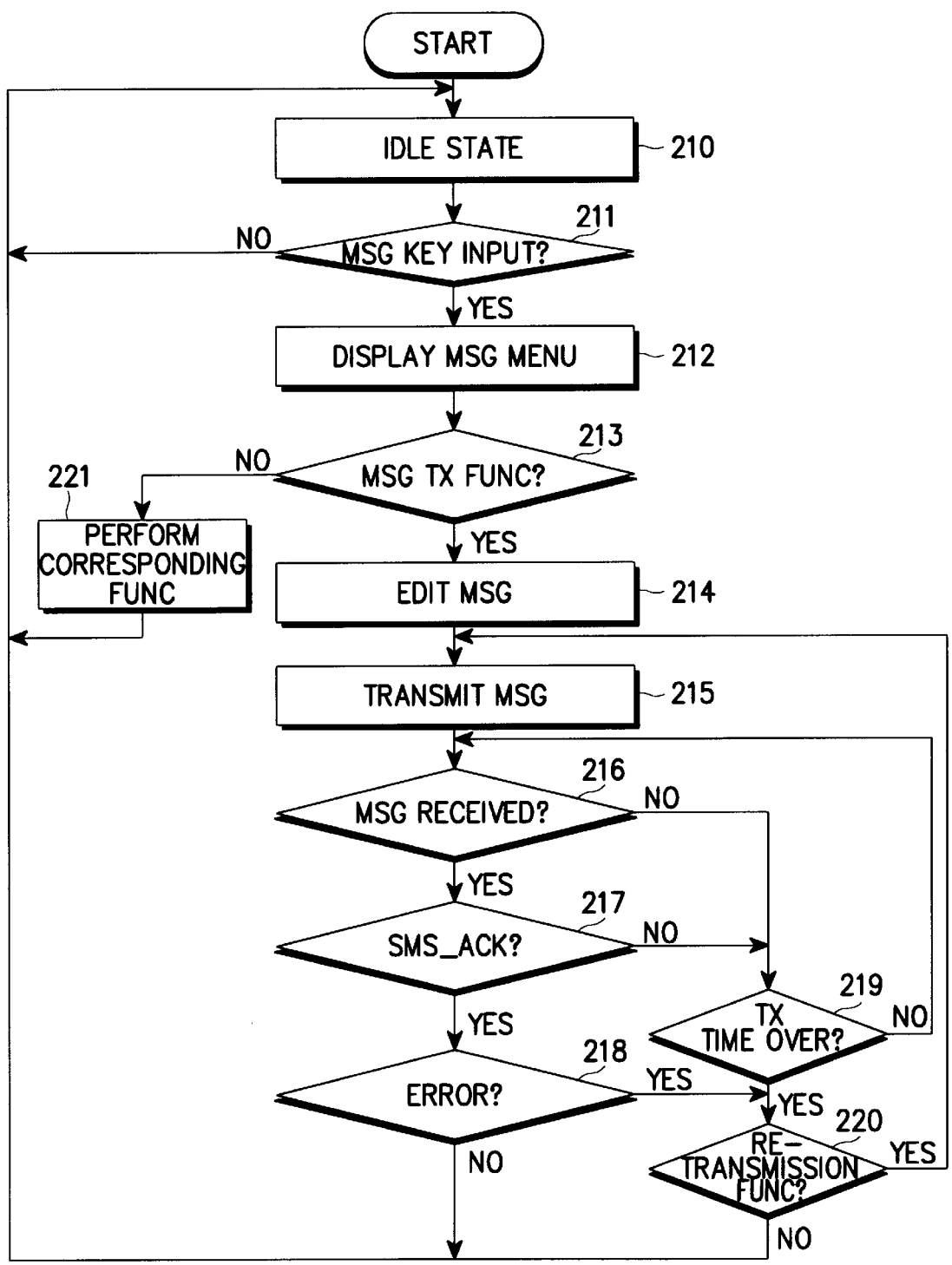
FIG. 2 is a flow chart illustrating a method according to an embodiment of the present invention for retransmitting a short message upon a transmission failure of the short message.

FIG. 2 is a flow chart illustrating a method according to an embodiment of the present invention for retransmitting a short message upon a transmission failure of the short message. A controller of mobile radio terminal 100 (hereinafter referred to as terminal controller) which is in an idle state at step 210, determines whether or not a message key is input (step 211). If the message key is input, then the terminal controller displays a message menu in character form on a display unit (step 212). The message menu may include, for example, a message transmission function, and a message reception function. Further, the transmission function may include, for example, a cellular paging transmission function and a cellular message transmission function.

After displaying the message menu, the terminal controller determines whether or not the message transmission function has been selected by the user (step 213). If it is determined that the message transmission function has not been selected, the terminal controller performs a corresponding function at step 221 and then, returns to step 210. However, if it is determined that the message transmission function has been selected by the user, then the terminal controller of mobile radio terminal 100 edits (e.g., composes) a short message to be transmitted (step 214). The short message is edited using a user interface (i.e., keypad). In editing the short message, the user may change a destination address (the phone number corresponding to the destination that is to receive the message), a call back number (the phone number corresponding to the origin of the short message), user data (the contents of the short message) and other necessary data such as message field data. For example, the user may compose the contents of the short message to be transmitted by editing frequently used short messages stored in mobile radio terminal 100 or by using character buttons.

Next, the terminal controller transmits the edited short message to mobile switching center 120 via base station 110 (step 215). The mobile switching center 120 then transmits a given short message to mobile radio terminal 100 upon receipt of the short message. The terminal controller then determines whether or not the given short message is received from mobile switching center 120 (step 216). If it is determined that the given short message is received, then the terminal controller determines whether or not the received short message is an acknowledge short message SMS_ACK (step 217). If it is determined that the received short message is an acknowledge short message SMS_

ACK, then the terminal controller analyzes a specific field of the acknowledge short message SMS__ACK to determine whether or not a transmission error has occurred with respect to the short message transmitted at 215 (step 218). For example, when the specific field is set to "1", the terminal controller determines that a transmission error has occurred. Otherwise, the terminal controller determines that the short message has been successfully transmitted.

If it is determined at step 218 that the short message has been successfully transmitted, then the procedure returns to step 210. However, if it is determined at step 218 that a transmission error has occurred, then it is determined whether or not the user has selected a retransmission function (step 220). If it is determined that the user has selected a retransmission function, then the procedure returns to step 215 to retransmit the same short message. However, if it is determined that the user has not selected the retransmission function, then the terminal controller returns to the idle state at step 210.

If the short message is not received from mobile switching center 120 at step 216 or the received short message is not an acknowledge short message SMS__ACK at step 217, then it is determined whether or not a predetermined transmission time has elapsed (step 219). If the predetermined transmission time has elapsed, then the procedure proceeds to step 220. However, if the transmission time has not elapsed, then the procedure returns to step 216.

It is to be appreciated that instead of analyzing the acknowledge short message SMS__ACK to determine whether or not a transmission error has occurred, the controller of mobile radio terminal 100 may alternatively perform this determination based on the receipt of a delivery acknowledge message or a user acknowledge message. The delivery acknowledge message and user acknowledge message are enabled by setting transmission options in the short message. The respective options are referred to as a delivery acknowledge message and a user acknowledge message. When SMS center 130 receives a short message set to the delivery acknowledge option, SMS center 130 acknowledges receipt of the short message to the originating terminal, transmits the short message to the destination terminal and then transmits the delivery acknowledge message to the originating terminal via mobile switching center 120. Alternatively, when the destination terminal receives a short message set to the user acknowledge option, the destination terminal transmits the user acknowledge message to SMS center 130. Then, SMS center 130 transmits the received user acknowledge message to the originating terminal via mobile switching center 120.

As described above, when a transmission failure occurs with respect to a short message, the mobile radio terminal queries a user to determine whether or not the user desires to retransmit the short message, and retransmits the short message if the user so desires. Accordingly and advantageously, the user need not repeat the input of the same message.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for retransmitting a short message in a mobile radio terminal upon a transmission failure of the short message, the method comprising the steps of:
    a) transmitting the short message and determining whether the short message is acknowledged as successfully transmitted within an interval of time;
    b) determining whether a user selects a retransmission function for the short message when the short message is not acknowledged as successfully transmitted within the interval of time;
    c) retransmitting the short message when the user selects the retransmission function and;
    c) repeating the determining portion of step a and steps b and c for subsequent retransmissions of the short message, the determining portion of step a and steps b and c being repeated until the short message is successfully transmitted or the retransmission function is not selected.

2. A method for retransmitting a short message in a mobile radio terminal upon a transmission failure of the short message, the method comprising the steps of:
    a) determining whether a message key is input, when the mobile radio terminal is in an idle state;
    b) displaying a message menu, when the message key is input;
    c) creating the short message, when a user chooses a message transmission function from the displayed message menu;
    d) transmitting the short message;
    e) determining whether an acknowledge short message is received within an interval of time to determine whether the short message is successfully transmitted;
    f) determining whether a user selects a retransmission function for the short message when the short message is not transmitted successfully;
    g) retransmitting the short message when the user selects the retransmission function and
    h) repeating steps e–g for subsequent retransmissions of the short message, steps e–g being repeated until the short message is successfully transmitted or the retransmission function is not selected.

3. The method of claim 2, wherein said creating step comprises at least one of receiving a destination address, a call back number and user data input by the user.

4. An apparatus for retransmitting a short message in a mobile radio terminal upon a transmission failure of the short message, comprising:
    a) means for transmitting the short message and determining whether the short message is acknowledged as successfully transmitted within an interval of time;
    b) means for determining whether a user selects a retransmission function for the short message when the short message is not acknowledged as successfully transmitted within the interval of time;
    c) means for retransmitting the short message when the user selects the retransmission function and
    d) means for initiating a repeating of the determining portion by the means of part a, the determining function by the means of part b and the retransmitting function by the means of part c for subsequent retransmissions of the short message, the determining portion by the means of part a, the determining function by the means of part b and the retransmitting function by the means of part c being repeated until the short message is successfully transmitted or the retransmission function is not selected.

5. The apparatus of claim 4, further comprising:
    means for determining whether a message key is input, when the mobile radio terminal is in an idle state;
    means for displaying a message menu, when the message key is input; and
    means for creating the short message, when a user chooses a message transmission function from the displayed message menu.

* * * * *